United States Patent Office 3,755,462
Patented Aug. 28, 1973

3,755,462
PROCESS FOR THE PREPARATION OF POLYETHER THIOETHERS
Eberhart Degener, Opladen, Germany, assignor to Bayer Aktiengesellschaft, Leverkusen, Germany
No Drawing. Filed Sept. 1, 1971, Ser. No. 177,100
Claims priority, application Germany, Sept. 4, 1970, P 20 43 899.7
Int. Cl. C07c 149/14
U.S. Cl. 260—609 R 7 Claims

ABSTRACT OF THE DISCLOSURE

This invention relates to an improved process for the preparation of polyether thioethers which are suitable for use as plasticizers. It has been found that the condensation of thioglycol which is catalyzed with phosphorous acid can be substantially accelerated by also adding a small quantity of a salt of metal from the group II, II–A, VIII–A of the Periodic System and an organic sulphonic acid.

---

This invention relates to an improved process for the preparation of polyether thioethers which are suitable for use as plasticizers.

The preparation of polyethers which are suitable for use as plasticizers is described in French patent specification No. 1,570,341, which polyethers are obtained by the condensation of 2-ethylhexanol, a polyethylene glycol-mono-n-butyl ether which has an average molecular weight in the range of from 200 to 400 and thiodiglycol in the molar ratio of 0.8–2:0.05–0.2:1.

These plasticizers have particularly advantageous properties if condensation of the reactants is carried out in the presence of acid compounds of trivalent phosphorous, preferably phosphorous acid, in quantities of 0.1 to 2% by weight. Apart from the said compounds of trivalent phosphorus, other acid catalysts have also been described for the condensation of thiodiglycol, e.g. toluenesulphonic acid, sulphuric acid and phosphoric acid, but the use of these catalysts always entails considerable side reactions which produce a dark colour in the condensate and thereby severely restrict the usefulness of the condensate as plasticizer. Phosphorous acid is the only one of these acid compounds which yields products which are not spoiled by discoloration, but condensation with phosphorous acid requires very long reaction times. For example, the preparation of a plasticizer in accordance with the above mentioned French patent specification requires a reaction time of 78 hours.

It has now surprisingly been found that the condensation of thiodiglycol which is catalysed with phosphorous acid can be substantially accelerated by also adding a small quantity of a salt of a divalent metal of group II, II–A or VIII–A of the Periodic System of Elements with an organic sulphonic acid to the reaction mixture.

The salts have the general formula $Me(SO_3R)_2$ in which:

Me represents a metal as just defined; and
R represents an aliphatic or aromatic radical.

The aliphatic radicals are straight chained or branched alkyl radicals with 1 to 18 and preferably 1 to 12 carbon atoms. The aromatic radicals are those with up to 10 carbon atoms in the ring system (preferably the phenyl radical); the aromatic radical may optionally be substituted with alkyl radicals with 1 to 12 and preferably 1 to 4 carbon atoms. The metal is preferably zinc. The salt used is preferably zinc toluene sulphonate. When used on their own, these neutral salts are not capable of catalysing the condensation of thiodiglycol. It is therefore surprising that the mixture with phosphorous acid has such a powerful catalytic action which is many times greater than that of phosphorous acid alone. It is also surprising that the addition of metal toluene sulphonates to the acid medium does not bring about the same discoloration of the condensation products as is caused by free toluene sulphonic acid.

The addition of metal sulphonates in accordance with the invention increases the velocity of the condensation reaction. This increase occurs in such a way that the autocondensation of thioglycol is reduced compared with the condensation of thioglycol with the monoalcohols.

The invention relates to a process for the preparation of a condensation product of thiodiglycol, an aliphatic alcohol and a polyethylene glycol-mono-alkylether, wherein thiodiglycol, an aliphatic alcohol with 6 to 10 carbon atoms and a polyethylene glycol-mono-alkyl ($C_3$–$C_5$) ether, which has an average molecular weight in the range of from 200 to 400 are reacted together in a molar ratio of 1:0.5–2:0.1–0.5 at a temperature in the range of from 140° C. to 220° C. and in the presence of a catalyst comprising phosphorous acid and an organic sulphonate of a metal from the group II, II–A or VIII–A of the Periodic System, and wherein the water formed is removed.

The reactants used are preferably thiodiglycol, 2-ethylhexanol and a polyethylene glycol-mono-butyl ether, which has an average molecular weight of 250 in the molar ratio of 1:0.7:0.3.

The sulphonic acid salts of divalent metals of groups II, II–A or VIII–A of the Periodic System which may be used as activators in the process according to the invention are e.g. zinc toluene sulphonate, calcium toluene sulphonate, cobalt toluene sulphonate, zinc benzene sulphonate and zinc dodecyl sulphonate. These salts are generally used in an amount of 0.01 to 2% by weight, preferably 0.05 to 0.5% by weight, based on the total weight of the reaction mixture at the start of the reaction; the upper limit is not critical. Phosphorous acid is generally used in an amount of 0.1 to 2% by weight, preferably 0.3 to 1.5% by weight, based on the total weight of the starting materials.

The metal sulphonates may also be added in the form of an aqueous solution to the reaction mixture or they may be produced in situ, e.g. by adding an equivalent quantity of the corresponding metal oxide or metal carbonate and e.g. toluene sulphonic acid to the reaction mixture.

The condensations are carried out in conventional manner, e.g. by heating the mixture of 2-ethylhexanol, polyethylene glycol-mono-n-butyl ether and thiodiglycol to temperatures of 140 to 220° C. in the presence of phosphorous acid and the metal sulphonates according to the invention and removing the water formed in the reaction. Excess 2-ethylhexanol is subsequently separated off, the catalysts are removed by washing with dilute aqueous acid ($H_2SO_4$) and water, and the product is dried. The reaction product may be improved by neutralizing it and interposing a separate reaction step consisting of a steam treatment which decomposes the esters of phosphorous acid formed and further reduces the odour of the product. The products obtained are light coloured liquid oils which are practically odourless. They constitute valuable plasticizers for elastomers (French patent specification No. 1,570,341).

The accelerating effect of the sulphonic acid salts is illustrated by the comparative experiment described below. The following reactants are weighed into two reaction flasks which are connected to a water separator by way of a small ascending tube:

975 g. of 2-ethylhexanol, 510 g. of thiodiglycol, 125 g. of polyethylene glycol-mono-n-butyl ether which has an average molecular weight of 250 and 12.3 g. (0.15 mol) of phosphorous acid. No other reactant is added to reaction mixture A; 8.14 g. (0.02 mol) of zinc toluene sulphonate are added to reaction mixture B.

Both reaction mixtures are stirred at a reaction temperature of 140° C. in a stream of nitrogen. After 4 hours 125 ml. of water have separated from reaction mixtures B by condensation whereas no water has separated from reaction mixture A.

EXAMPLE 1

860 g. of 2-ethyl-hexanol, 1.098 kg. of thiodiglycol and 650 g. of polyethylene glycol-mono-n-butyl ether which has an average molecular weight of 250 are weighed into a condensation vessel made of V2A steel, and 15 g. of phosphorous acid, 50 g. of an aqueous 18% by weight solution of zinc toluene sulphonate and 3 g. of bis-4-hydroxyphenylpropane are added to the reaction mixture.

The reaction temperature is then slowly raised to 140 to 160° C. by external heating, and the mixture of 2-ethylhexanol and water which distils off is condensed in an esterification attachment, the water is removed and 2-ethylhexanol is returned to the reaction. 210 ml. of water are separated in the course of 5.5 hours. While continuing the reaction in this manner, the pressure is slowly reduced from 760 mm. Hg to 12 mm. Hg in the course of 6.5 hours and the temperature is slowly raised from 160° C. to 180° C.

125 ml. of water are obtained in this stage of the reaction. Lastly, condensation is carried out on a descending cooler at a reaction temperature of 210° C. and a pressure of 7 mm. Hg for 2 hours. 14 g. of a 50% by weight aqueous solution of sodium hydroxide, 8.8 g. of disodium hydrogen phosphate, 12 H$_2$O and 10 ml. of water are added to the product with stirring, and steam is blown through the reaction mixture for 1½ hours. The resulting reaction mixture is then washed with a solution of 45 g. of sodium sulphate and 170 ml. of aqueous 20% by weight sulphuric acid in 470 ml. of water, and the product is separated at 60° C. It is then washed with 270 ml. of water, and the oil is separated off at 60° C. The product is neutralised with dilute aqueous sodium hydroxide solution and dried at 150° C. for 2 hours. After filtration through a suction filter, 2 kg. of a pale yellow, thin liquid oil are obtained which is very suitable for use as a plasticizer for elastomers. $n_D^{20}$ 1.4728; $\eta_{25}$=18.6 cp.

EXAMPLE 2

430 g. of 2-ethylhexanol, 549 g. of thiodiglycol and 325 g. of polyethyleneglycol - mono - n - butylether which has an average molecular weight of 250 are condensed with 7.5 g. of phosphorous acid, 4.5 g. of zinc toluene sulphonate and 1.5 g. of bis - 4 - hydroxyphenyl-propane in a glass flask by the method described in Example 1. After neutralisation of the product, steam is blown through it for 2 hours and it is then dried in a vacuum at 150° C. for 2 hours. It is removed from the precipitated salts by suction filtration. 1028 g. of a colourless oil are obtained. $n_D^{20}$ 1.4724; viscosity $\eta_{25}$=18.5 cp.

EXAMPLE 3

(a) 860 g. of 2-ethylhexanol, 1.098 kg. of thiodiglycol and 650 g. of polyethylene glycol-mono-n-butylether which has an average molecular weight of 250 are condensed with 15 g. of phosphorus acid, 9.9 g. of cobalt toluene-sulphonate and 3 g. of bis-4-hydroxyphenyl-propane by the method described in Example 1. 1.970 kg. of a slightly reddish oil which has the same properties as the product described in Example 1 is obtained on working up. $n_D^{20}$ 1.4742; $\eta_{25}$=21.0 cp.

(b) If the same method is employed but 9.7 g. of calcium toluenesulphonate are added, 1.910 kg. of a dark yellow oil which has the same properties is obtained, $n_D^{20}$ 1.4783; $\eta_{25}$=26.3 cp.

What we claim is:

1. A process for the preparation of a condensation product of thiodiglycol, an aliphatic alcohol and a polyethylene glycol-mono-alkyl ether, said process comprising heating (a) thiodiglycol, (b) an aliphatic alcohol having 6 to 10 carbon atoms and (c) a polyethylene glycol mono-alkyl ether having 3 to 5 carbon atoms in the alkyl moiety and an average molecular weight in the range of from 200 to 400 in a molar ratio of (a):(b):(c) of 1:0.5–2:0.1–0.5 at a temperature of from 140 to 220° C. and in the presence of a catalyst mixture containing 0.01 to 2% by weight of an organic sulphonate of a metal from Group II, II–A or VIII–A of the Periodic System and 0.1 to 2% by weight of phosphorous acid, said weights being based on the total weight of the starting materials, and removing water of condensation from resulting reaction mixture.

2. The process of claim 1 wherein the organic sulphonate of said metal is a compound having the formula $$Me(SO_3R)_2$$

in which Me is said metal and R is an aliphatic or aromatic radical.

3. The process of claim 2 wherein the organic sulphonate of said metal is zinc toluene sulphonate, calcium toluene sulphonate, cobalt toluene sulphonate, zinc benzene sulphonate or zinc dodecyl sulphonate.

4. The process of claim 1 wherein (b) is 2 - ethyl-hexanol.

5. The process of claim 4 wherein (c) is polyethylene glycol-mono-n-butyl ether.

6. The process of claim 1 wherein (c) is polyethylene glycol-mono-n-butyl ether.

7. The process of claim 1 wherein, following removal of said water of condensation, the reaction product is neutralized and subjected to a steam treatment to decompose formed esters of phosphorous acid.

References Cited
UNITED STATES PATENTS 3,188,353   6/1965   Holtschmidt  _____ 260—609 R
3,595,923   7/1971   Schmelzer et al.  \_\_ 290—609 R LEWIS GOTTS, Primary Examiner D. R. PHILLIPS, Assistant Examiner